(12) United States Patent
Lin et al.

(10) Patent No.: US 6,433,065 B1
(45) Date of Patent: Aug. 13, 2002

(54) SILICA-REINFORCED RUBBER COMPOUNDED WITH MERCAPTOSILANES AND ALKYL ALKOXYSILANES

(75) Inventors: Chen-Chy Lin, Hudson; William L. Hergenrother, Akron, both of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/687,440

(22) Filed: Oct. 13, 2000

(51) Int. Cl.[7] .................................................. C08K 3/34
(52) U.S. Cl. ...................................... 524/492; 524/495
(58) Field of Search .................................. 524/492, 495

(56) References Cited

U.S. PATENT DOCUMENTS

| | | | |
|---|---|---|---|
| 3,768,537 A | 10/1973 | Hess et al. ................... | 152/330 |
| 3,814,160 A | 6/1974 | Creasy ........................ | 152/330 |
| 4,002,594 A | 1/1977 | Fetterman | |
| 4,436,847 A | 3/1984 | Wagner ....................... | 523/203 |
| 4,474,908 A | 10/1984 | Wagner ....................... | 523/213 |
| 4,519,430 A | 5/1985 | Ahmad et al. | |
| 5,227,425 A | 7/1993 | Rauline ....................... | 524/493 |
| 5,580,919 A | 12/1996 | Agostini et al. ............. | 524/430 |
| 5,674,932 A | 10/1997 | Agostini et al. ............. | 524/430 |
| 5,717,022 A | 2/1998 | Beckmann et al. .......... | 524/493 |
| 5,780,538 A | 7/1998 | Cohen et al. ................ | 524/494 |
| 5,804,636 A | 9/1998 | Nahmias et al. ............. | 524/492 |
| 5,866,171 A | 2/1999 | Kata ........................... | 425/46 |
| 5,876,527 A | 3/1999 | Tsuruta et al. ............... | 152/541 |
| 5,914,364 A | 6/1999 | Cohen et al. ................ | 524/494 |
| 5,916,951 A | 6/1999 | Nahmias et al. ............. | 524/492 |
| 5,929,149 A | 7/1999 | Matsuo et al. ............... | 524/262 |
| 5,931,211 A | 8/1999 | Tamura ....................... | 152/209.5 |
| 5,971,046 A | 10/1999 | Koch et al. ................. | 152/152.1 |
| 6,025,428 A | 2/2000 | Day ............................ | 524/492 |
| 6,053,226 A | 4/2000 | Agostini ..................... | 152/209.5 |
| 6,080,809 A | 6/2000 | Stuhldreher ................. | 524/447 |

FOREIGN PATENT DOCUMENTS

| | | |
|---|---|---|
| CA | 2177095 | 11/1996 |
| CA | 2242783 | 1/1999 |
| CA | 2242801 | 1/1999 |
| CA | 2243091 | 1/1999 |
| EP | 0 801 112 | 10/1997 |
| EP | 0 890 603 | 1/1999 |
| EP | 0 890 606 | 1/1999 |
| EP | 0 926 192 | 6/1999 |
| EP | 0 972 790 | 1/2000 |
| EP | 0 972 799 | 1/2000 |
| EP | 1 031 604 | 8/2000 |
| EP | 1 061 097 | 12/2000 |
| JP | 11 181161 | 7/1999 |
| WO | WO 99/02601 | 1/1999 |
| WO | WO 99/09036 | 2/1999 |
| WO | WO 00/05300 | 2/2000 |
| WO | WO 00/05301 | 2/2000 |
| WO | WO 00/32684 | 6/2000 |

*Primary Examiner*—Edward J. Cain
(74) *Attorney, Agent, or Firm*—Meredith Palmer (57) ABSTRACT

The invention provides a sulfur vulcanizable silica-reinforced elastomeric compound having improved tensile mechanical and dynamic viscoelastic properties. The compounds are formed by mixing an elastomer optionally having an alkoxysilane terminal group, with silica in the presence of an alkyl alkoxysilane for desired processability and a mercaptosilane for increasing the bound rubber content. In particular, the mercaptosilane and the alkyl alkoxysilane are present in a ratio of a maximum of 0.14:1. Preferably, the mercaptosilane and the alkyl alkoxysilane are compounded with the elastomer and the silica at high temperature in the first mixing stage.

26 Claims, 2 Drawing Sheets

SILICA-REINFORCED RUBBER COMPOUNDED WITH MERCAPTOSILANES AND ALKYL ALKOXYSILANES

FIELD OF THE INVENTION

The invention generally relates to vulcanizable elastomeric compounds containing silica as a reinforcing filler.

BACKGROUND OF THE INVENTION

When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, modulus, tangent delta (tan δ), and the like. Rubber articles, especially tires, produced from vulcanized elastomers exhibiting these improved properties will have reduced hysteresis, better rolling resistance, snow and ice traction, wet traction, and improved fuel economy for vehicles equipped with such tires.

With the increasing use of silica as a reinforcing filler for rubber, filler dispersion in rubber stocks has become a major concern. Because polar silanol groups on the surface of silica particles tend to self-associate, reagglomeration of silica particles can occur after compounding, leading to poor silica dispersion and a high compound viscosity. The strong silica filler network results in a rigid uncured compound that is difficult to process in extrusion and forming operations. Previous attempts at preparing readily processable, vulcanizable silica-filled rubber stocks containing natural rubber or diene polymer and copolymer elastomers have focused on the use, during compounding, of bifunctional silica coupling agents having a moiety (e.g., a silyl group) reactive with the silica surface, and a moiety (e.g., a mercapto, amino, vinyl, epoxy or sulfur group) that binds to the elastomer. Well known examples of such silica coupling agents are mercaptosilanes and bis(trialkoxysilylorgano) polysulfides, such as bis(3-triethoxysilylpropyl) tetrasulfide which is sold commercially as Si69 by Degussa.

In particular, γ-mercaptoalkyltrialkoxysilanes have been reported to offer excellent coupling between rubber and silica, resulting in rubbers having improved wet ice skid resistance, rolling resistance and tread wear, as well as improved adhesion between rubber and cords. However, the high chemical reactivity of the —SH functions of the mercaptosilanes with organic polymers can lead to unacceptably high viscosities during processing and to premature curing (scorch). The tendency of a rubber compound to scorch makes compounding and processing more difficult. Mixing and milling must be done more quickly, yet at lower temperatures (e.g., 120° C. to 145° C.), so that the compound will not begin to vulcanize before it is shaped or molded. The low processing temperature results in a marked reduction in the mechanical activity of mixing which is essential for an optimum dispersion of the silica throughout the polymer matrix. Therefore, compared with carbon black-filled compositions, tread compounds having good silica dispersion require a longer mixing time at a lower temperature to achieve improved performance, resulting in decreased production and increased expense. Moreover, like bis(trialkoxysilylorgano) polysulfide silica coupling agents, mercaptosilanes are relatively costly.

Another disadvantage of the use of mercaptosilane silica coupling agents is that low temperature mixing results in a relatively slow rate of the chemical reaction between the alkoxysilyl portion of the mercaptosilane and the silica (the alkoxysilane-silica reaction). Because this reaction results in the release of a substantial amount of alcohol, a slow reaction rate results in the presence of unreacted alkoxysilyl groups in the compounded product that are then available to further react with the silica and moisture during storage, extrusion, tire build, and/or curing, resulting in an undesirable increase in the compound viscosity, and a shorter shelf life. Moreover, the continuing reaction in the compound evolves more alcohol, resulting in porous zones or blisters which can form surface defects in the resulting formed rubber articles and/or can impair the dimensional stability of treads during extrusion and tire building. As a result, a low tread strip drawing speed must be maintained to ensure that the drawn product conforms with specifications, resulting in a further decrease in production and concomitant increase in costs.

To address the expense and other problems related to mercaptosilanes and other bifunctional silica coupling agents, recent approaches to improving dispersion of silica in rubber compounds have been directed to reducing or replacing the use of such silica coupling agents by employing silica dispersing agents, such as monofunctional silica shielding agents (e.g., silica hydrophobating agents that chemically react with the surface silanol groups on the silica particles but are not reactive with the elastomer) and agents which physically shield the silanol groups, to prevent reagglomeration (flocculation) of the silica particles after compounding. For example, silica dispersing agents, such as alkyl alkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters, and fillers such as mica, talc, urea, clay, sodium sulfate, and the like, are the subjects of EP 890603 and EP 890606. Such silica dispersing agents can be used to replace all or part of expensive bifunctional silica coupling agents, while improving the processability of silica-filled rubber compounds by reducing the compound viscosity, increasing the scorch time, and reducing silica reagglomeration. To achieve a satisfactory cure of the rubber compound, the use of silica dispersing aids includes employing an increased amount of sulfur in a mixing step when curing agents are added to the composition, to replace sulfur that otherwise would have been supplied by a sulfur-containing silica coupling agent.

An advantage of the use of silica dispersing aids during compounding of elastomers with silica is that, unlike the bifunctional silica coupling agents described above, the dispersing agents do not contain sulfur and, thus, they can be used at high temperature, e.g., about 165° C. to about 200° C., in the absence of curing agents, without increasing the risk of premature curing. At these high temperatures, the reaction between the silica and alkoxysilyl groups of alkyl alkoxysilane silica dispersing agents is accelerated, resulting in an increase in the amount of alcohol evolved and evaporated during compounding, and a decrease in evolution of alcohol from the compound during storage, extrusion, curing and tire build.

SUMMARY OF THE INVENTION

Unexpectedly, it has been discovered that improvements in the tensile mechanical properties and dynamic viscoelastic properties of silica-reinforced sulfur vulcanized rubbers can be achieved by compounding polymers with silica at a temperature of about 130° C. to about 200° C., in the presence of an alkyl alkoxysilane silica dispersing aid and a very small amount of a mercaptosilane silica coupling agent. The terms elastomer, polymer and rubber are used interchangeably herein, as is customary in the rubber industry. In particular, the weight ratio of the mercaptosilane to the alkyl alkoxysilane is a maximum of 0.14:1, preferably about 0.001:1 to about 0.10:1, and typically about 0.01:1 to about 0.10:1. The mercaptosilane is present in the compound in an amount of about 0.0001% to about 3% by weight, typically about 0.001% to about 1.5% by weight, and especially about 0.01% to about 1% by weight, based on the weight of the silica. It has been discovered that the use of such a small amount of the mercaptosilane, even at a high mixing temperature, unexpectedly does not result in premature curing. Therefore, the mercaptosilane and alkyl alkoxysilane can be mixed with the elastomer and silica reinforcing filler in the first stage of the mixing process, at a higher temperature (e.g., about 155° C. to about 200° C., especially about 170° C. to about 185° C.) than previously allowable for conventional amounts of mercaptosilane coupling agents, allowing a shorter mixing time with a concomitant savings in production time and expense, and improved performance of the ultimate rubber product.

In the compounding of the elastomer with silica, the mercaptosilane facilitates binding of the silica by the polymer, and the alkyl alkoxysilane provides a desirable compound viscosity for processability, resulting in vulcanized elastomeric compounds demonstrating tensile mechanical and dynamic viscoelastic properties that are improved over similar compounds prepared with alkyl alkoxysilanes at the same temperature, in the absence of the mercaptosilane. These properties of the invention compounds also are comparable to, or improved over, similar compounds prepared with conventional amounts of bis (trialkoxysilylorgano) polysulfide silica coupling agents, such as Si69, at about 160° C. or less. A conventional amount of Si69, for example, is about 5% to about 20% by weight, based on the weight of the silica.

In particular, the vulcanized elastomeric compounds of the invention exhibit improved compound viscosity, improved dispersion of silica, reduced filler flocculation after compounding, increased bound rubber content, and decreased evolution of alcohol during extrusion, curing, and tire build, resulting in lower hysteresis and improved wear resistance in the vulcanized product. The compounds also exhibit improved dynamic viscoelastic properties, especially a higher tensile modulus at 300% strain, a lower storage modulus (G') at −20° C., a higher tan δ at 0° C., and a lower tan δ at 50° C. Such properties have been commonly used in the tire industry to predict tire performance in the categories of snow and ice traction (G' at −20° C.), wet traction (tan δ at 0° C.), and rolling resistance (tan δ at 50° C.).

The invention also provides a method for making the sulfur vulcanized compound of the invention, and a pneumatic tire having at least one component that comprises the vulcanized compound.

DETAILED DESCRIPTION OF THE INVENTION

The invention provides a sulfur-vulcanizable elastomeric compound comprising an elastomer optionally having an alkoxysilane terminal group, a reinforcing filler comprising silica or a mixture thereof with carbon black, an alkyl alkoxysilane, a mercaptosilane silica coupling agent, and a cure agent comprising an effective amount of sulfur to achieve a satisfactory cure. The weight ratio of the mercaptosilane to the alkyl alkoxysilane is a maximum of 0.14:1. Preferably the weight ratio of the mercaptosilane to the alkyl alkoxysilane is about 0.001:1 to about 0.10:1 and, more preferably, is about 0.01:1 to about 0.10:1. The amount of the mercaptosilane and the alkyl alkoxysilane in the compound is based on the weight of silica in the compound, as is known to those skilled in the art of rubber compounding.

The alkyl alkoxysilane can be present in an amount of about 0.1% to about 20% by weight, based on the weight of the silica. Preferably, the alkyl alkoxysilane is present in an amount of about 1% to about 15% by weight and, more preferably, in an amount of about 1% to about 10% by weight, based on the weight of the silica. Correspondingly, at a weight ratio of mercaptosilane to alkyl alkoxysilane of a maximum of 0.14:1, the mercaptosilane can be present in the compound in the amount of about 0.0001% to about 3% by weight, typically about 0.001% to about 1.5% by weight and, especially about 0.01% to about 1% by weight, based on the weight of the silica.

Mercaptosilanes suitable for use in the invention compounds have the formula where X is a halogen or an alkoxy; R is $C_1$ to $C_4$ alkylene; R' is independently $C_1$ to about $C_{30}$ alkyl, about $C_7$ to about $C_{30}$ alkaryl, about $C_5$ to about $C_{30}$ cycloaliphatic, or $C_6$ to about $C_{20}$ aromatic; and "n" is an integer from 1 to 3. The halogen can be selected from the group consisting of chlorine, bromine, iodine, and fluorine, preferably chlorine. R is preferably $C_1$ to $C_3$ alkylene, X is preferably an alkoxy, and n is preferably 3.

Exemplary mercaptosilanes include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproxysilane, 18-mercaptooctadecyldiethoxychlorosilane, and the like, and mixtures of any of the foregoing.

Alkyl alkoxysilanes suitable for use in the invention compound have the formula where the alkoxy groups are the same or different from each other, each $R^1$ independently comprises $C_1$ to about $C_{20}$ aliphatic, about $C_5$ to about $C_{20}$ cycloaliphatic, or about $C_6$ to about $C_{20}$ aromatic, each $R^2$ independently comprises $C_1$ to about $C_6$, and p is an integer from 1 to 3. Preferably, at least one $R^1$ contains from 6 to 20 carbon atoms and the remainder of the $R^1$ groups, if any, contain from 1 to 3 carbon atoms. Preferably, $R^2$ contains 1 to 4, more preferably 1 or 2, carbon atoms. Preferably $R^2$ is an alkyl group. More preferably, at least one $R^1$ is much larger in terms of carbon atoms than an $R^2$ contained in the alkoxy groups of the silane.

Exemplary alkyl alkoxysilanes include, but are not limited to, octyl triethoxysilane, octyl trimethoxysilane, trimethyl ethoxysilane, cyclohexyl triethoxysilane, isobutyl triethoxysilane, ethyl trimethoxysilane, cyclohexyl tributoxysilane, dimethyl diethoxysilane, methyl triethoxysilane, propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyloctyl dimethoxysilane, and mixtures thereof Preferably, the alkyl alkoxysilane is a trialkoxysilane. More preferably, the alkyl alkoxysilane is selected from at least one of n-octyl triethoxysilane, n-hexadecyl triethoxysilane, n-octadecyl triethoxysilane, and methyl n-octyl diethoxysilane.

Although alkyl alkoxysilanes and mercaptosilanes employing methoxysilane groups can be used, it is preferred for environmental reasons that ethoxysilanes are employed, rather than methoxysilanes, because ethyl alcohol, rather than methyl alcohol, will be released when the alkoxysilane portion of the coupling agent reacts with the surface of the silica particle.

As discussed below, the elastomer is preferably selected from the group consisting of homopolymers of conjugated diene monomers, and copolymers and terpolymers of the conjugated diene monomers with monovinyl aromatic monomers and trienes. Exemplary elastomers include, but are not limited to, polyisoprene, polystyrene, polybutadiene, butadiene-isoprene copolymer, butadiene-isoprene-styrene terpolymer, isoprene-styrene copolymer, and styrene-butadiene copolymer.

The sulfur-vulcanized elastomeric compound of the invention is prepared by the steps of (a) mixing together at a temperature of about 130° C. to about 200° C. in the absence of added sulfur and cure agents, an elastomer optionally having an alkoxysilane terminal group, a reinforcing filler comprising silica or a mixture thereof with carbon black, an alkyl alkoxysilane, and a mercaptosilane, wherein the ratio of the mercaptosilane to the alkyl alkoxysilane is a maximum of 0.14:1; (b) allowing the mixture to cool below the mixing temperature; (c) mixing the mixture obtained in step (b), at a temperature lower than a vulcanization temperature, with a cure agent and an effective amount of sulfur to achieve a satisfactory cure; and (d) curing the mixture obtained in step (c). The compound is usually cured at about 140° C. to about 190° C. for about 5 to about 120 minutes.

In particular, the initial step of the method requires that the mixture reaches a temperature from about 130° C. to about 200° C., preferably about 155° C. to about 200° C., more preferably about 165° C. to about 200° C., most preferably about 170° C. to about 200° C., especially about 170° C. to about 185° C. In one embodiment of the invention, the initial mixing step can include at least two substeps. That is, the initial mixing step can comprise a first substep (i) mixing together the elastomer, at least a portion of the silica, at least a portion of alkyl alkoxysilane and at least a portion of the mercaptosilane, with an optional intervening cooling step; and a second substep (ii) mixing the mixture obtained in step (i) with the remainder of the silica, if any, and the remainder of the alkyl alkoxysilane and/or mercaptosilane, if any.

The method can further include a remill step in which either no ingredients are added to the first mixture, or non-curing ingredients are added, in order to reduce the compound viscosity and improve the dispersion of the silica reinforcing filler. The temperature of the remill step is typically about 130° C. to about 175° C., especially about 145° to about 165° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C. and is typically about 40° C. to about 120° C., preferably about 60° C. to about 110° C. and, especially, about 75° C. to about 100° C.

The order of addition of the silica, alkyl alkoxysilane and mercaptosilane to the mixer in the initial step of the method is not critical. The alkyl alkoxysilane and/or the mercaptosilane can be added prior to or after the addition of the silica. In one embodiment, a portion of the silica and the mercaptosilane and/or the alkyl alkoxysilane are added simultaneously to the mixer. For example, the mercaptosilane and/or the alkyl alkoxysilane can be partially or fully supported on the silica and/or the carbon black reinforcing filler. An exemplary commercial product containing a mercaptosilane supported on silica is available from PPG Industries, as Ciptane®255LD. The ratio of the amount of supported silane to the filler is not critical. If the silane is a liquid, a suitable ratio of supported silane to filler is that which results in a suitably dry material for addition to the elastomer. For example, the ratio can be about 1/99 to about 70/30, about 20/80, about 60/40, about 50/50, and the like.

It has been found that the use of an alkyl alkoxysilane with a very small amount of mercaptosilane requires an appropriate adjustment in the amount of sulfur added to the elastomeric compound to achieve a satisfactory cure of the compound. In particular, the amount of the mercaptosilane employed in the present invention provides substantially less sulfur than required for a satisfactory cure. An effective amount of sulfur in an invention composition would provide a property of the cured compound that is approximately equal to the same property of a satisfactorily cured compound containing a conventional amount of Si69 with a conventional amount of sulfur. Exemplary cured compound properties for comparison include, but are not limited to, the value of the 300% modulus (psi), the molecular weight between crosslinks ($M_c$, g/mol), and the like, and other cured compound properties that are well known to those skilled in the art of rubber making. The increased amount of sulfur to compensate for the reduced availability of sulfur from the mercaptosilane silica coupling agent will vary from composition to composition, depending on the amount of silica and the amount of mercaptosilane silica coupling agent present in the formulation. Based on the disclosure contained herein, and in the examples of invention compositions described below, one skilled in the art of rubber compounding can easily determine the effective amount of sulfur required for a satisfactory cure of the compound without undue experimentation. The additional sulfur can take any form, including soluble sulfur, insoluble sulfur, or any of the sulfur-donating compounds described as vulcanizing agents below, or mixtures of the foregoing.

The compound produced by the foregoing method preferably exhibits about a 4% to about a 40% increase in the tensile modulus at 300% strain compared to a similar compound containing the alkyl alkoxysilane, mixed at the temperature, in the absence of the mercaptosilane. Preferably, the compound further exhibits about a 10% to about a 30% decrease in filler flocculation after compounding, as measured by ΔG', and/or reduced hysteresis as measured by about a 1% to about a 30% decrease in tangent δ at 65° C., and/or about a 10% to about a 30% increase in the bound rubber content, compared to a similar compound containing the alkyl alkoxysilane, mixed at the temperature, in the absence of the mercaptosilane.

The tensile mechanical properties of the invention compounds also are comparable to, or improved over, similar compounds prepared with a bifunctional silica coupling agent, such as Si69, at 160° C. or less, in the absence of an alkyl alkoxysilane and a mercaptosilane.

In addition to the alkyl alkoxysilane and mercaptosilane in the compound, it can be desirable to employ one or more additional dispersing aids, such as a fatty acid ester of hydrogenated or non-hydrogenated $C_5$ and $C_6$ sugars, and the polyoxyethylene derivatives thereof, or a mineral or non-mineral additional filler, with the sorbitan fatty acid esters being preferred.

Exemplary fatty acid esters of hydrogenated and non-hydrogenated $C_5$ and $C_6$ sugars (e.g., sorbose, mannose, and arabinose) that are useful as an additional processing aid include the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80. Generally, a useful amount of these additional processing aids is about 0.1% to about 25% by weight based on the weight of the silica, with about 0.5% to about 20% by weight being preferred, and about 1% to about 15% by weight based on the weight of the silica being more preferred. Esters of polyols, including glycols such as polyhydroxy compounds and the like, in the same quantities, are also useful.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, T-Maz® 80, and the like. The Tween® products are commercially available from ICI Specialty Chemicals. Generally, a useful amount of these additional processing aids is about 0.1% to about 25% by weight based on the weight of the silica, with about 0.5% to about 20% by weight being preferred, and about 1% to about 15% by weight based on the weight of the silica being more preferred.

The fatty acid esters described above, and their polyoxyethylene derivatives, can be fully or partially supported by the reinforcing filler. The ratio of the dispersing agent to the reinforcing filler is not critical. If the dispersing agent is a liquid, a suitable ratio of dispersing agent to filler is that which results in a suitably dry material for addition to the elastomer. For example, the ratio can be about 1/99 to about 70/30, about 20/80 about 60/40, about 50/50, and the like.

Certain additional fillers can be utilized according to the present invention as processing aids, including mineral fillers, such as clay (hydrous aluminum silicate), talc (hydrous magnesium silicate), aluminum hydrate $[Al(OH)_3]$ and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr. These additional fillers can also be used as non-reinforcing fillers to support processing aids, such as those described above. As with the support of the processing aid on the reinforcing filler, as described above, the ratio of processing aid to non-reinforcing filler is not critical. For example, the ratio can be about 1/99 to about 70/30, about 20/80 about 60/40, about 50/50, and the like.

The vulcanizable elastomeric composition is preferably compounded with reinforcing fillers, such as silica, or a mixture of silica and carbon black. Examples of silica reinforcing filler which can be used in the vulcanized elastomeric compounds of the invention include precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about one to about 100 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165MP), and J. M. Huber Corporation.

The elastomers can be compounded with all forms of carbon black in a mixture with the silica. The carbon black can be present in amounts ranging from about one to about 50 phr, with about five to about 35 phr being preferred. The carbon blacks can include any of the commonly available, commercially-produced carbon blacks, but those having a surface area (EMSA) of at least 20 m²/g and, more preferably, at least 35 m²/g up to 200 m²/g or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

The present invention can be used in conjunction with any solution polymerizable or emulsion polymerizable elastomer. Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. Thus, the elastomeric products can include diene homopolymers from monomer A and copolymers thereof with monovinyl aromatic monomers B. Exemplary diene homopolymers are those prepared from diolefin monomers having from about four to about 12 carbon atoms. Exemplary vinyl aromatic copolymers are those prepared from monomers having from about eight to about 20 carbon atoms. Copolymers can comprise from about 99 percent to about 50 percent by weight of diene units and from about one to about 50 percent by weight of monovinyl aromatic or triene units, totaling 100 percent. The polymers, copolymers and terpolymers of the present invention can have 1,2-microstructure contents ranging from about 10 percent to about 80 percent, with the preferred polymers, copolymers or terpolymers having 1,2-microstructure content of from about 25 to 65 percent, based upon the diene content. The elastomeric copolymers are preferably random copolymers which result from simultaneous copolymerization of the monomers A and B with randomizing agents, as is known in the art.

Preferred polymers for use in a vulcanized elastomeric compound of the invention include polyisoprene, polystyrene, polybutadiene, butadiene-isoprene copolymer, butadiene-isoprene-styrene terpolymer, isoprene-styrene copolymer, and styrene-butadiene copolymer.

Anionic polymerization initiators for use in polymerizing the anionically polymerizable monomers include, but are not limited to, organo-sodium, organo-potassium, organo-tin-lithium, organo-lithium, dialkylimido-lithium and cycloalkylimido-lithium initiators. As an example of such initiators, organo-lithium compounds useful in the polymerization of 1,3-diene monomers are hydrocarbyl lithium compounds having the formula RLi, where R represents a hydrocarbyl group containing from one to about 20 carbon atoms, and preferably from about 2 to about 8 carbon atoms. Although the hydrocarbyl group is preferably an aliphatic group, the hydrocarbyl group can also be cycloaliphatic or aromatic. The aliphatic group can be a primary, secondary, or tertiary group, although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octadecyl. The aliphatic group can contain some unsaturation, such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organo-lithium compounds which are useful as anionic initiators in the polymerization of the monomers listed above, especially conjugated dienes include, but are not limited to, n-butyl lithium, n-propyl lithium, iso-butyl lithium, tert-butyl lithium, tributyl tin lithium (described in co-owned U.S. Pat. No. 5,268,439), amyl-lithium, cyclohexyl lithium, and the like. Other suitable organo-lithium compounds for use as anionic initiators are well known to those skilled in the art. A mixture of different lithium initiator compounds also can be employed. The preferred organo-lithium initiators are n-butyl lithium, tributyl tin lithium and "in situ" produced lithium hexamethyleneimide initiator prepared by reacting hexamethyleneimine and n-butyl lithium (described in co-owned U.S. Pat. No. 5,496,940).

The amount of initiator required to effect the desired polymerization can be varied over a wide range depending upon a number of factors, such as the desired polymer molecular weight, the desired 1,2- and 1,4-content of the polydiene, and the desired physical properties for the polymer produced. In general, the amount of initiator utilized can vary from as little as 0.2 millimoles (mM) of lithium per 100 grams of monomers up to about 100 mM of lithium per 100 grams of monomers, depending upon the desired polymer molecular weight.

Polymerization is usually conducted in a conventional solvent for anionic polymerizations, such as hexane, cyclohexane, benzene and the like. Various techniques for polymerization, such as semi-batch and continuous polymerization can be employed.

In order to promote randomization in co-polymerization and to increase vinyl content, a polar coordinator can optionally be added to the polymerization ingredients. Amounts range between about one to about 90 or more equivalents per equivalent of lithium. The amount depends upon the type of polar coordinator that is employed, the amount of vinyl desired, the level of styrene employed and the temperature of the polymerizations, as well as the selected initiator. Compounds useful as polar coordinators are organic and include tetrahydrofuran, linear and cyclic oligomeric oxolanyl alkanes such as 2-2'-di(tetrahydrofuryl) propane, dipiperidyl ethane, hexamethyl phosphoramide, N-N'-dimethyl piperazine, diazabicyclo octane, dimethyl ether, diethyl ether, tributyl amine and the like. The linear and cyclic oligomeric oxolanyl alkane polar coordinators are described in U.S. Pat. No. 4,429,091, the subject matter of which regarding polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary amines, such as tetramethylethylene diamine (TM:EDA).

Polymerization is begun by charging a blend of the monomer(s) and solvent to a suitable reaction vessel, followed by the addition of the polar coordinator and the initiator previously described. The procedure is carried out under anhydrous, anaerobic conditions.

Often, it is conducted under a dry, inert gas atmosphere. The polymerization can be carried out at any convenient temperature, such as about 0° C. to about 150° C. For batch polymerizations, it is preferred to maintain the peak temperature at from about 50° C. to about 150° C. and, more preferably, from about 60° C. to about 100° C. Polymerization is allowed to continue under agitation for about 0.15 hours to 24 hours. After polymerization is complete, the product is terminated by a quenching agent, an endcapping agent and/or a coupling agent, as described herein below. The terminating agent is added to the reaction vessel, and the vessel is agitated for about 0.1 hours to about 4.0 hours. Quenching is usually conducted by stirring the polymer and quenching agent for about 0.01 hours to about 1.0 hour at temperatures of from about 20° C. to about 120° C. to ensure a complete reaction. Polymers terminated with an alkoxysilane functional group, as discussed herein below, are subsequently treated with alcohol or other quenching agent.

Lastly, the solvent is removed from the polymer by conventional techniques such as drum drying, extruder drying, vacuum drying or the like, which can be combined with coagulation with water, alcohol or steam. If coagulation with water or steam is used, oven drying can be desirable.

One way to terminate the polymerization reaction is to employ a protic quenching agent to give a monofunctional polymer chain. Quenching can be conducted in water, steam or an alcohol such as isopropanol, or any other suitable method. Quenching can also be conducted with a functional terminating agent, resulting in a difunctional polymer. Any compounds providing terminal functionality (i.e., endcapping) that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and mixtures thereof. Further examples of reactive compounds include the terminators described in co-owned U.S. Pat. Nos. 5,521,309 and 5,066,729, the subject matter of which, pertaining to terminating agents and terminating reactions, is hereby incorporated by reference. Other useful terminating agents can include those of the structural formula $(R)_a ZX_b$, where Z is tin or silicon. It is preferred that Z is tin. R is an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R can include methyl, ethyl, n-butyl, neophyl, phenyl, cyclohexyl or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride, as well as tetraethoxysilane, $Si(OEt)_4$, and methyl triphenoxysilane, $MeSi(OPh)_3$. The practice of the present invention is not limited solely to these terminators, since other compounds that are reactive with the polymer bound carbon-lithium moiety can be selected to provide a desired functional group.

While terminating to provide a functional group on the terminal end of the polymer is preferred, it is further preferred to terminate by a coupling reaction with, for example, tin tetrachloride or other coupling agent such as silicon tetrachloride or esters. High levels of tin coupling are desirable in order to maintain good processability in the subsequent manufacturing of rubber products. It is preferred that the polymers for use in the vulcanizable elastomeric compositions according to the present invention have at least about 25 percent tin coupling. That is, about 25 percent of the polymer mass after coupling is of higher molecular weight than the polymer before coupling as measured, for example, by gel permeation chromatography. Preferably, before coupling, the polydispersity (the ratio of the weight average molecular weight to the number average molecular weight) of polymers, which can be controlled over a wide range, is from about one to about 5, preferably one to about 2 and, more preferably, one to about 1.5.

As noted above, various techniques known in the art for carrying out polymerizations can be used to produce elastomers polymers suitable for use in the vulcanizable elastomeric compositions, without departing from the scope of the present invention.

The preferred conjugated diene polymers, or copolymers or terpolymers of conjugated diene monomers and monovinyl aromatic monomers, can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber and the like. When the vulcanizable elastomeric composition of the present invention is blended with conventional rubbers, the amounts can vary widely with a lower limit comprising about ten percent to 20 percent by weight of the total rubber. The minimum amount will depend primarily upon the physical properties desired.

Vulcanized elastomeric compounds of the invention are prepared by the method described above. It is readily understood by those having skill in the art that the rubber compound would be compounded by methods generally known in the rubber compounding art, such as mixing the various vulcanizable polymer(s) with various commonly used additive materials such as, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in conventional amounts., in addition to other conventional rubber additives including, for example, other fillers, plasticizers, antioxidants, cure agents and the like, using standard rubber mixing equipment and procedures.

Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants comprise about 0.1 to about 5 phr. Suitable antioxidants, such as diphenyl-p-phenylenediamine, are known to those skilled in the art. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about one to about 5 phr. Typical amounts of waxes comprise about one to about 2 phr. Often microcrystalline waxes are used. Typical amounts of peptizers, if used, comprise about 0.1 to about 1 phr. Typical peptizers can be, for example, pentachlorothiophenol and dibenzamidodiphenyl disulfide.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. The sulfur vulcanizing agents are used in an amount ranging from about 0.1 to about 10 phr, more preferably about 1.5 to about 7.5 phr, with a range of about 1.5 to about 5 phr being most preferred.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenylguanidine (DPG) and the like. The amount of the vulcanization accelerator used is about 0.1 to about 5 phr, preferably about 0.2 to about 3 phr.

Pneumatic tires having an improved tensile mechanical and dynamic viscoelastic properties, and comprising at least one component produced from the sulfur-vulcanized elastomeric compound of the invention, according to the method of the invention described above, preferably exhibit about a 4% to about a 40% increase in the tensile modulus at 300% strain, or reduced hysteresis as measured by about a 1% to about a 30% decrease in tan δ at 65° C., compared to a tire component produced from a similar compound containing the alkyl alkoxysilane in the absence of the mercaptosilane.

EXAMPLES

The following examples illustrate methods of preparation of the vulcanizable elastomeric composition of the present invention. However, the examples are not intended to be limiting, as other methods for preparing these compositions and different compounding formulations may be determined by those skilled in the art without departing from the scope of the invention herein disclosed and claimed.

Example 1

Synthesis of Tin-Coupled TEOS-Terminated SBR

This polymer is a solution styrene-butadiene rubber (SBR) copolymer, in which some of the polymer chains are tin-coupled and others are terminated with an tetraethoxysilane (TEOS) functionalizing agent to produce an ethoxysilane terminated polymer, $P-Si-(OEt)_3$. This polymer was used to prepare the rubber stocks designated "Invention Stock 1" and comparison examples C-A and C-B in Table 5. The polymer was also used in the rubber mixture of Invention Stock 2 and comparison example C-C.

To a one gallon reactor was charged 0.07 kg of hexane, 0.41 kg of 33.0 percent by weight styrene in hexane, and 1.74 kg 22.4 percent by weight butadiene in hexane. Then, 0.28 ml of 1.6 M 2-2'-di(tetrahydrofuryl) propane in hexane, 0.63 ml of 0.6 M potassium t-amylate in hexane, 1.42 ml of 3.54 M hexamethyleneimine and 3.93 ml of 1.6 M n-butyl lithium in hexane were charged into the reactor, and the jacket temperature was set at 122° F. After 97 minutes, 2.20 ml of 0.25 M tin tetrachloride in hexane was added to the reactor. Ten minutes later, 2.53 ml of 1.12 M tetraethoxy-orthosilicate was added to the reactor. After 15 additional minutes, the cement was discharged from the reactor, coagulated with isopropanol, treated with DBPC, and drum dried. The properties of the polymer were: $ML_{1+4}$=52.4; percent chain coupling=74.5%; $M_n$=1.50×10$^5$.

Example 2

In order to demonstrate the methods of preparation and properties of the vulcanized elastomeric compounds of the invention, seven stocks of rubbers were prepared as indicated in Tables 1, 2 and 3, and compounded using the compounding formulations and mixing conditions shown in Tables 4 and 5. Invention stocks 1 and 2 and comparison stocks C-B and C-E were compounded with silica and the other ingredients, in the master batch stage to a temperature of 175° C., and then cooled and remilled to a temperature of 155° C. Invention stock 2 was then remilled a second time without the addition of further ingredients. A second remill without further ingredients is typically performed to lower the Mooney viscosity of the compound.

The 3-mercaptopropyltriethoxysilane (MS) was used in liquid form or in the form of Ciptane® 255 LD from PPG Industries, which is MS carried on silica. When Ciptane® was employed, the amount of silica added to the compound was adjusted to maintain a total silica amount of 30 phr.

As illustrated in Table 5, invention stock 1 was a tin-coupled TEOS-terminated SBR prepared in Example 1 above, compounded with silica, octyl triethoxysilane (OTES), and 3-mercaptopropyltriethoxysilane (MS) at a ratio of MS:OTES of 0.067:1 in the master batch stage to an achieved temperature of 175° C. For comparison, stock C-A was the same tin-coupled TEOS-terminated SBR compounded with silica and the silica coupling agent, Si69, in the absence of MS and OTES. In this comparison stock (C-A), the Si69 was mixed with the other ingredients in the remill stage to an achieved temperature of 155° C., in order to avoid premature curing which would occur at a temperature of 160° C. or greater. Comparison stock C-B was the same tin-coupled TEOS-terminated SBR compounded with silica and OTES in the master batch stage at high temperature, in the absence of MS and Si69, to illustrate the effects of the OTES silica dispersing aid in the absence of a silica coupling agent. The total sulfur content of invention stock 1 and comparison stock C-B was adjusted to compensate for the reduction in the amount of sulfur in comparison with that donated by the Si69 in C-A.

Invention stock 2 was prepared by compounding the mixture of tin-coupled TEOS-terminated SBR, solution SBR, cis-butadiene rubber and natural rubber, with silica, MS and OTES at a ratio of MS:OTES of 0.083:1. In this example, an additional silica dispersing aid, sorbitan monooleate (SMO), was added. Because of the presence of the SMO dispersing aid, which was used in liquid form, the amount of process oil and plasticizer (dioctylpthalate) was adjusted, compared to the comparison stock C-C. Comparison stock C-C was prepared by compounding the same polymer mixture with silica in the master batch stage at high temperature, in the absence of MS, OTES and SMO, and Si69 was added in the remill stage to an achieved temperature of 155° C. The total sulfur content of stock 2 was adjusted to compensate for the reduction in the amount of sulfur in comparison with that donated by the Si69 in stock C-C.

Comparison stocks C-D and C-E were prepared with tin-coupled SBR mixed with natural rubber. Stock C-D was compounded with Si69 in the remill stage, and stock C-E was compounded with MS in the master batch stage. Neither of these stocks contained OTES.

All of the compounded final stocks prepared as described above were sheeted and subsequently annealed at 171° C. for 15 minutes.

TABLE 1

Formulation of Invention Stock 1 and Comparison Stocks C-A and C-B

| Ingredient | Amount (phr) |
|---|---|
| Tin-coupled solution SBR, tetraethoxysilane (TEOS)-terminated | 100 |
| Carbon Black (SAF) | 35 |
| Precipitated Silica | 30 |
| Silica coupling agent* | varied |
| Alkyl alkoxysilane, OTES** | varied |
| Naphthenic Process Oil | 15 |
| Wax | 1.5 |
| Antioxidant, N-(1,3-dimethylbutyl)-N'-phenyl-p-phenylene-diamine | 0.95 |
| Sulfur | varied |
| Accelerator, N-cyclohexyl-2-benzothiazylsulfenamide (CBS) | 1.5 |

TABLE 1-continued

Formulation of Invention Stock 1 and Comparison Stocks C-A and C-B

| Ingredient | Amount (phr) |
|---|---|
| Zinc Oxide | 2.5 |
| Diphenyl guanidine | 0.5 |

*Si69 liquid (Degussa); or liquid 3-mercaptopropyl triethoxysilane or 3-mercaptopropyl triethoxysilane carried on silica (Ciptane ® 255LD from PPG Industries)
**OTES = n-octyltriethoxysilane

TABLE 2

Formulation of Invention Stock 2 and Comparison Stock C-C

| Ingredient | Amount (phr) |
|---|---|
| Tin-coupled solution SBR, tetraethoxysilane (TEOS)-terminated | 50 |
| Solution SBR | 20 |
| Cis-butadiene rubber | 10 |
| Natural Rubber | 20 |
| Carbon Black (SAF) | 28.3 |
| Precipitated Silica | 33 |
| Silica coupling agent* | varied |
| Alkyl alkoxysilane, OTES** | varied |
| Sorbitan monooleate | varied |
| Dioctylphthalate (plasticizer) | varied |
| Naphthenic Process Oil | varied |
| Wax | 1.0 |
| Antioxidant, N-(1,3-dimethylbutyl)-N'-phenyl-p-phenylene-diamine | 0.95 |
| Sulfur | varied |
| Accelerator, N-cyclohexyl-2-benzothiazylsulfenamide (CBS) | 1.5 |
| Zinc Oxide | 3.0 |
| Diphenyl guanidine | varied |

*Si69 liquid (Degussa); or liquid 3-mercaptopropyl triethoxysilane or 3-mercaptopropyl triethoxysilane carried on silica (Ciptane ® 255LD from PPG Industries)
**OTES = n-octyltriethoxysilane

TABLE 3

Formulation of Comparison Stocks C-D and C-E

| Ingredient | Amount (phr) |
|---|---|
| Tin-coupled solution SBR | 75 |
| Natural Rubber | 25 |
| Carbon Black (SAF) | 35 |
| Precipitated Silica | 30 |
| Silica coupling agent* | varied |
| Naphthenic Process Oil | 15 |
| Wax | 1.5 |
| Antioxidant, N-(1,3-dimethylbutyl)-N'-phenyl-p-phenylene-diamine | 0.95 |
| Sulfur | varied |
| Accelerator, N-cyclohexyl-2-benzothiazylsulfenamide (CBS) | 1.5 |
| Zinc Oxide | 2.5 |
| Diphenyl guanidine | 0.5 |

*Si69 liquid (Degussa); or liquid 3-mercaptopropyl triethoxysilane or 3-mercaptopropyl triethoxysilane carried on silica (Ciptane ® 255LD from PPG Industries)

TABLE 4

Mixing Conditions

| | |
|---|---|
| Mixer | 310 g Brabender |
| Agitation Speed | 60 rpm |

TABLE 4-continued

Mixing Conditions

Master Batch Stage

| | |
|---|---|
| Initial Temperature | 100° C. |
| 0 seconds | charging polymers |
| 30 seconds | charging carbon black, silica, mercaptosilane (if added), alkyl alkoxysilane (if added), sorbitan monooleate (if added), all pigments, plasticizer (if added), naphthenic oil (if added) |
| 5 minutes | drop |
| Drop Temperature | 175° C. |

Remill 1 Stage (Stock 1, and Comparisons C-A, C-B, C-D and C-E, only)

| | |
|---|---|
| Initial Temperature | 70° C. |
| 0 seconds | charging master batch stock |
| 30 seconds | charging Si69 (if added), charging remainder of silica (if any) |
| Drop Temperature | 155° C. |

Remill 2 Stage (Stock 2 and Comparison C-C only)

| | |
|---|---|
| Initial Temperature | 70° C. |
| 0 seconds | charging remill 1 stock |
| Drop Temperature | 155° C. |

Final Batch Stage

| | |
|---|---|
| Initial Temperature | 90° C. |
| 0 seconds | charging remilled stock |
| 30 seconds | charging cure agent and accelerators |
| Drop Temperature | 105° C. | is the time required for the viscosity to increase by five Mooney units during a Mooney scorch measurement. It is used as an index to predict how fast the compound viscosity will increase during processing (e.g., during extrusion). The Payne effect ($\Delta G'$) was measured using an RPA 2000 viscometer (Alpha Technologies). The strain sweep test ($\Delta G'$) was conducted at 50° C. at 0.1 Hz using strain sweeping from 0.25% to 1000%.

As illustrated in Table 6, the compound Mooney viscosity of invention stock 1 containing both the MS and the OTES is slightly higher than that of stock C-A which employs Si69 alone, and that of stock C-B which employs OTES alone. However, the value is within a satisfactory range. Improvement in the viscosity of C-B can be achieved by the addition of more OTES and/or adding another silica dispersing aid, such as sorbitan monooleate or a polyoxyethylene derivative, according to the teachings described hereinabove. The reduced Payne effect of invention stock 1 indicates improved silica dispersion (less filler flocculation after compounding), compared to both C-A and C-B. Invention stock 2, which contains the MS, OTES and SMO shows a comparable compound Mooney viscosity in comparison to C-C, which contains only Si69. A lower compound Mooney viscosity is advantageous because it provides better processability and handling, especially during the extrusion process. As expected, the Mooney viscosity of stock C-E, compounded in the master batch with only MS was too high to measure with the instrument. The addition of MS and OTES in the masterbatch (invention stock 2) does not cause any processing difficulties.

TABLE 5

Ingredients Used In Various Rubber Stocks

| Stock Number | Polymer type and amount (phr) | Si69 (phr) | Mercapto-silane (phr) | Octyltriethoxy silane (phr) | Sorbitan Monooleate | Oil (phr) | Dioctylpthalate (phr) | Sulfur (phr) |
|---|---|---|---|---|---|---|---|---|
| C-A | Tin-coupled TEOS-SBR (100) | 3 | 0 | 0 | 0 | 15 | 0 | 1.7 |
| C-B | Tin-coupled TEOS-SBR (100) | 0 | 0 | 3 | 0 | 15 | 0 | 2.5 |
| Invention Stock 1 | Tin-coupled TEOS-SBR (100) | 0 | 0.2 | 3 | 0 | 15 | 0 | 2.5 |
| C-C | Tin-coupled TEOS-SBR (50) + rubber mixture (50), remilled | 3.3 | 0 | 0 | 0 | 3 | 8 | 1.9 |
| Invention Stock 2 | Tin-coupled TEOS-SBR (50) + rubber mixture (50), remilled | 0 | 0.15 | 1.8 | 5 | 0 | 4 | 2.7 |
| C-D | Tin-coupled (75) NR (25) | 3 | 0 | 0 | 0 | 15 | 0 | 1.7 |
| C-B | Tin-coupled (75) NR (25) | 0 | 2.74 | 0 | 0 | 15 | 0 | 2.1 |

Example 3

The green stock (i.e., the stock obtained after the final stage, prior to curing) was characterized as to Mooney viscosity and Payne effect ($\Delta G'$) and cure characteristics. The Mooney viscosity measurement was conducted at 130° C. using a large rotor, and was recorded as the torque when rotor had rotated for 4 minutes. The stocks were preheated at 130° C. for 1 minute before the rotor was started. The $t_5$ The bound rubber content of invention stock 1 is higher than comparison stock C-A containing Si69, and much higher than comparison stock C-B containing OTES alone. Thus, the addition of the MS in invention stock 1 increases the bound rubber content from 54.7% to 64.2%, a 17% increase over C-B. This indicates that the addition of just a small amount of the MS efficiently enhances the interactions between the silica and the polymer.

A Monsanto Rheometer MD2000 was used to characterize the stock curing process, at a frequency of 1.67 Hz and a strain of 7% at 171° C. The measurements $t_{S2}$ and $t_{90}$ are the times taken for an increase in torque of 2% and 90%, respectively, of the total torque increase during the cure characterization test. These values are useful in predicting the speed of the viscosity increase ($t_{S2}$) and the cure rate during the cure process ($t_{90}$).

The data illustrated in Table 6 show that the $t_5$ scorch time and the $t_{S2}$ of invention stocks 1 and 2 are longer than their corresponding comparison stocks, giving the invention stocks the advantage of a larger processing time window, especially during extrusion, and a longer time to flow and fill the mold. The relatively fast curing rates of invention stocks 1 and 2 is another advantage.

TABLE 6

The green stock Mooney viscosity and cure characteristics

| Stock Number | Mooney @ 130° C. | $t_5$ scorch @ 130° C. (min) | Δ G' (kPa) (G' @ 0.25% – G' @ 1000%) | $t_{S2}$ @ 171° C. (min) | $t_{90}$ @ 171° C. (min) | ML | % bound rubber |
|---|---|---|---|---|---|---|---|
| C-A | 71.4 | 18.29 | 830 | 1.79 | 13.58 | 2.52 | 60.57 |
| C-B | 73.7 | 28.82 | 937 | 2.96 | 12.74 | 2.53 | 54.70 |
| Invention Stock 1 | 78.4 | 20.29 | 780 | 1.86 | 6.13 | 2.51 | 64.17 |
| C-C | 76.0 | 13.45 | ND** | 1.46 | 6.11 | 3.81 | ND |
| Invention Stock 2 | 77.0 | 13.11 | ND | 1.38 | 3.74 | 3.7 | ND |
| C-D | 59.3 | 18.63 | 794 | 2.22 | 6.93 | 2.28 | ND |
| C-E | — | — | 2428 | 1.35 | 4.35 | 6.59 | ND |

*Torque is too high to measure
**ND = Not Done

Example 4

A good silica coupling and dispersing agent should disperse the silica during compounding and stabilize the filler morphology during storage and curing of the compounds. The three stocks prepared in Example 1 were examined for filler flocculation (the Payne effect) before and after they were annealed at 171° C. for 15 minutes, as described above. The Payne effects of the green stocks (the invention stocks and comparison stocks) were measured using the Rubber Process Analyzer (RPA) 2000 viscometer (Alpha Technologies). The comparison of the stocks before and after annealing is expressed as the change in the Δ G' values (Δ(Δ G')). The annealing conditions employed are similar to conventional curing conditions. The stocks do not contain curatives, therefore an increase in Δ G' cannot be attributed to sulfur crosslinking. This comparison illustrates the degree to which the filler flocculates prior to cure.

TABLE 7

The ΔG' of the remill stocks before and after annealing at 171° C. for 15 minutes

| Stock Number | ΔG' (kPa) before annealing | ΔG' (kpa) after annealing | Δ(ΔG'), difference in ΔG' after - before annealing (kPa) |
|---|---|---|---|
| C-A | 1269 | 2304 | 1035 |
| C-B | 869 | 1135 | 266 |
| Invention Stock 1 | 1112 | 1464 | 352 |

TABLE 7-continued

The ΔG' of the remill stocks before and after annealing at 171° C. for 15 minutes

| Stock Number | ΔG' (kPa) before annealing | ΔG' (kpa) after annealing | Δ(ΔG'), difference in ΔG' after - before annealing (kPa) |
|---|---|---|---|
| C-D | 944 | 2864 | 1920 |
| C-E | 2486* | 1442 | 1044 |

*torque is greater than instrument limit, datum was taken as G' at 0.28% strain.

As illustrated by the results shown in Table 7, the Δ(Δ G') of invention stock 1, containing both MS and OTES, and comparison stock C-B, containing OTES only, are both significantly lower than comparison stock C-A containing Si69, and comparison stocks, C-D and C-E, containing Si69 alone and MS alone, respectively, indicating considerably less filler flocculation after heating. Therefore, mixing of the silica and the alkyl alkoxysilane at high temperature (175° C.) results in better control of the filler morphology in the green stock, and a reduction in filler flocculation after curing, and the addition of a small amount of MS provides even greater improvement in these properties. Moreover, the presence of a small amount of MS does not affect the silica-shielding effect provided by the alkyl alkoxysilane.

Example 5

Figure 1:
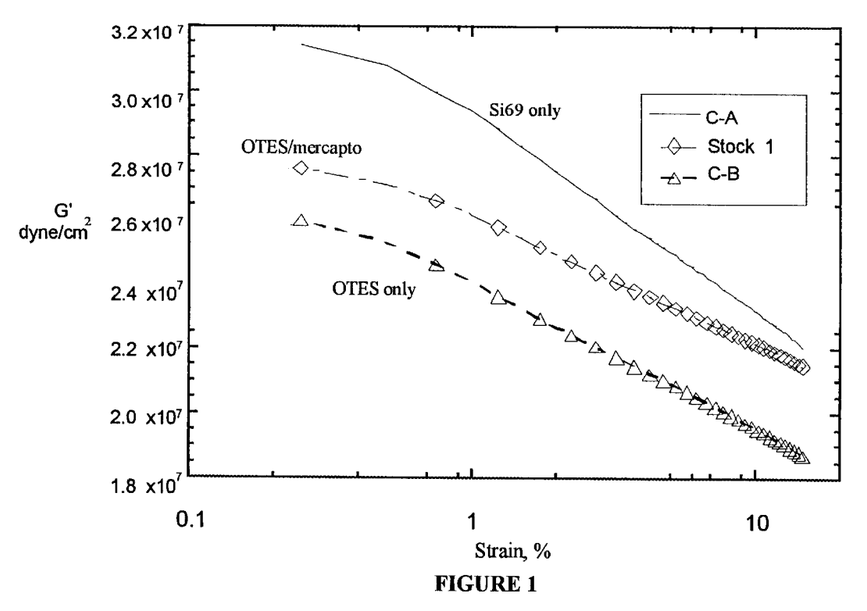
FIG. 1 illustrates the results of a strain sweep test of an invention cured rubber stock containing both an alkyl alkoxysilane and a mercaptosilane, and a comparison stock containing the alkyl alkoxysilane only, both stocks mixed at 175° C., and a comparison stock containing Si69 only, mixed at 155° C.
Figure 2:
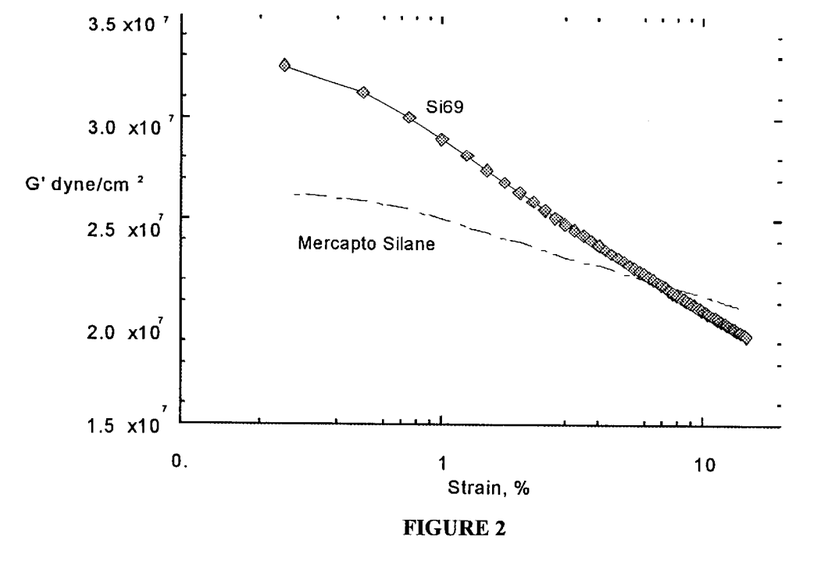
FIG. 2 illustrates the results of a strain sweep test of comparison cured rubber stocks containing Si69 mixed at 155° C., or a mercaptosilane mixed at 175° C. in the absence of an alkyl alkoxysilane.
Figure 3:
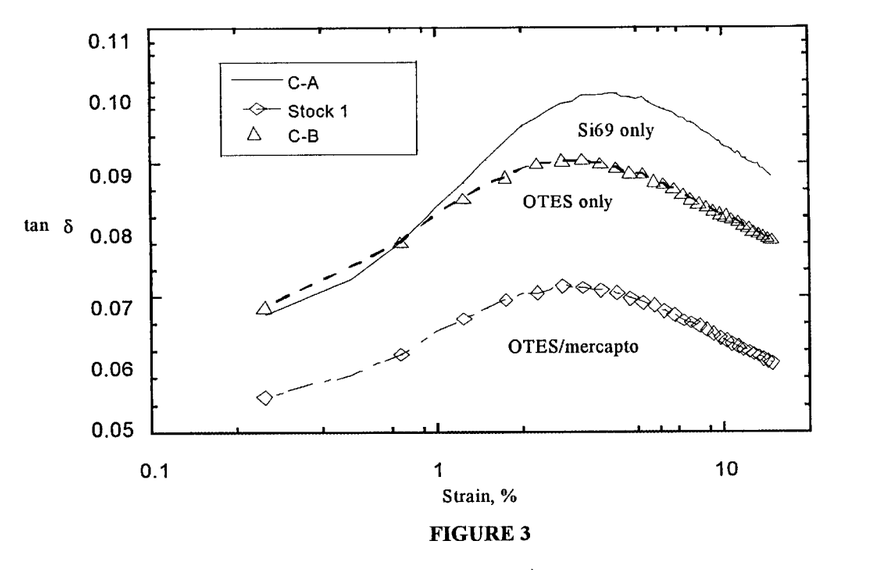
FIG. 3 illustrates the results of a strain sweep test showing the tan δ of the stocks illustrated in FIG. 1.

To further study the Payne effect, strain sweep studies of the three cured stocks (invention stock 1 and comparison stocks C-A and C-B) were conducted at 65° C. at a frequency of 3.14 radians/second, and a strain sweeping from 0.25% to 14.75%. The strain sweep spectra and tan δ of invention stock 1 and comparison stocks C-A and C-B are illustrated in FIG. 1 and FIG. 3, respectively. The strain sweep spectra of comparison stocks C-D and C-E are illustrated in FIG. 2. The data obtained from the strain sweep for the Payne effect (ΔG') and tan δ at 7% strain are listed in Table 8.

As illustrated in FIG. 1, the Payne effect of invention stock 1, containing MS and OTES, and comparison stock C-B, containing OTES only, are both lower than comparison stock C-A, containing Si69, indicating a decreased filler network structure provided by the silica shielding by the alkyl alkoxysilane. The strain sweep data showing the G' curve of the MS-containing comparison stock C-B is almost parallel to that of the comparison stock C-A. In contrast, the G' curve of invention stock 1 is different than that of C-A, and the difference between the two curves becomes smaller and smaller as the strain increases, becoming almost the same at a strain over 10%. In contrast, the G' curve of the stock containing OTES alone (C-B) does not approach that of C-A. These G' curve comparisons indicate that more constraints that resist deformation are formed in the invention stock 1 due to the presence of MS, than in the stock containing OTES alone (C-B). While not being bound by theory, it is believed that the increase in constraints formed in the MS/OTES stock is due to interactions between the polymer and the fillers. It appears that the addition of a small amount of MS to the alkyl alkoxysilane-containing stock at high temperature promotes the formation of such constraints. This interpretation of the curves is supported by a comparison of the G' curves of FIG. 2. The comparison stock C-E, containing only MS has a higher G' at high strain levels than the Si69, indicating that more constraints are formed through polymer-filter interaction by MS than by Si69. The more constraints formed in the rubber can also result in lower hysteresis, as seen in FIG. 3, where the tan δ of invention stock 1 containing both MS and OTES is less than both the comparison stocks C-A and C-B containing Si69 and MS, respectively.

Example 6

The dynamic viscoelastic properties of the cured invention and comparison stocks are listed in Table 8, and were obtained from strain and temperature sweep tests. In particular, the storage modulus (G') at −20° C. and the tan δ at 0° C. and 50° C. were obtained from temperature sweep tests conducted at a frequency of 31.4 radians/second using 0.5% strain for the temperatures ranging from −100° C. to −10° C. and 2% strain for the temperatures ranging from −10° C. to +100° C. The tan δ at 0° C. of invention stocks 1 and 2 (MS and OTES) and comparison stock C-B (OTES) are higher than the Si69 comparison stocks C-A and C-C, indicating an improvement in tire wet traction over the Si69 stock. However, invention stock 1 also shows a higher tan δ at 0° C. than that containing OTES alone (C-B), indicating a further improvement in wet traction when the combination of MS and OTES is used. Invention stocks 1 and 2 also show a lower storage modulus (G' at −20° C.) than their respective comparison stocks, indicating improved snow and ice traction. The lower tan δ at 50° C. of invention stocks 1 and 2 will result in decreased rolling resistance.

Figure 4:
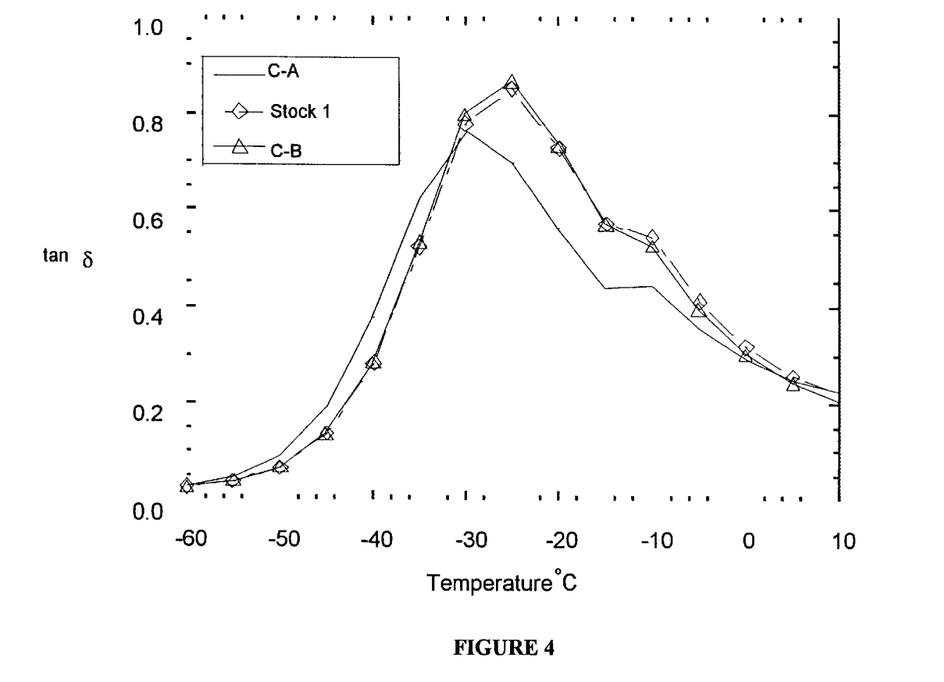
FIG. 4 illustrates the results of a temperature sweep test of the stocks illustrated in FIG. 1.

The temperature sweep data in FIG. 4 illustrates that the temperature spread around the $T_g$ (i.e., the peak of the tan δ curve) of invention stock 1 and comparison stock C-B is broader than comparison stock C-A. The temperature spread of invention stock 1 is even broader than that of C-B, indicating more interactions formed between polymer and filler when MS is present with OTES in the rubber. Without being bound by theory, it is believed that these data indicate that more polymer chains are immobilized around the filler particle surfaces. The tan δ curves of both invention stock 1 and comparison stock C-B are shifted toward a higher temperature compared to C-A. The wider tan δ peak around the $T_g$ will result in higher hysteresis, which could benefit the rubber with better wet traction. For example, tan δ at −10° C., shown in Table 8, is higher in both invention stock 1 and comparison stock C-B, than in comparison stock C-A, and higher in stock 1 than in stock C-B, indicating improvement when the small amount of MS is added in addition to the OTES.

Example 7

The tensile mechanical properties for the seven stocks were measured using the standard procedure described in ASTM-D 412 at 25° C. The tensile test specimens were round rings with a diameter of 0.05 inches and a thickness of 0.075 inches. A gauge length of 1.0 inches was used for the tensile test. As illustrated by the results of the tensile tests in Table 9, the invention stock 1 showed similar or superior tensile strength and elongation at break as the comparison stock C-A containing Si69. The lower tensile modulus at 300% strain (M300) of the comparison stock (C-B) containing the alkyl alkoxysilane alone, is improved when a small amount of MS is added (invention stock 1) at high temperature during mixing. However, without the presence of OTES or shielding agents, comparison stock C-E which contains only MS as the dispersing agent, appears overcured because the elongation at break is 50% lower than comparison stock C-D, with a very high tensile modulus, which will result in poor mechanical properties.

TABLE 8

The dynamic viscoelastic properties measured by temperature and strain sweeps

| Stock Number | Δ G' (MPa) (G' @ 0.25% − G' @ 14.75%) (S.S.) | tan δ @ 7% strain @ 65° C. (S.S.) | G' @ −20° C. (MPa) (T.S.) | tan δ @ 0° C. (T.S.) | tan δ @ 50° C. (T.S.) | Temperature spread @ tan δ = 0.6 (or tan δ = 0.3)* | tan δ @ −10° C. (T.S.) |
|---|---|---|---|---|---|---|---|
| C-A | 0.93 | 0.0968 | 27.2 | 0.2917 | 0.1347 | 13.73 | 0.4438 |
| C-B | 0.72 | 0.0858 | 25.2 | 0.3046 | 0.1138 | 18.31 | 0.5216 |
| Invention Stock 1 | 0.61 | 0.0669 | 26.8 | 0.3197 | 0.1188 | 18.31 | 0.5447 |
| C-C | 3.34 | 0.1574 | 35.0 | 0.2720 | 0.2015 | 28.47* | 0.1794 |
| Invention Stock 2 | 2.78 | 0.1502 | 30.0 | 0.2802 | 0.1950 | 30.52* | 0.1950 |
| C-D | 1.07 | 0.0932 | 32.03 | 0.3289 | 0.1443 | 13.67 | 0.3863 |
| C-E | 0.56 | 0.0736 | 33.5 | 0.35 | 0.111 | 14.30 | 0.4935 |

TABLE 9

Tensile mechanical properties at 25° C.

| Stock Number | M50 (psi) | M300 (psi) | Strength, Tb (psi) | Elongation at Break, Eb (%) | Toughness (psi) |
|---|---|---|---|---|---|
| C-A | 212 | 2247 | 3042 | 374 | 4595 |
| C-B | 211 | 2050 | 3217 | 410 | 5337 |
| Invention Stock 1 | 225 | 2643 | 3409 | 361 | 4978 |
| C-C | 230 | 1762 | 3054 | 454 | 4965 |
| Invention | 222 | 1833 | 2703 | 401 | 4632 |

TABLE 9-continued

Tensile mechanical properties at 25° C.

| Stock Number | M50 (psi) | M300 (psi) | Strength, Tb (psi) | Elongation at Break, Eb (%) | Toughness (psi) |
|---|---|---|---|---|---|
| Stock 2 | | | | | |
| C-D | 215 | 1918 | 2528 | 368 | 3932 |
| C-E | 287 | ND | 1705 | 167 | 1162 |

In summary, improvements in the tensile mechanical and dynamic viscoelastic properties, especially the tensile modulus at 300% strain, of silica-reinforced sulfur vulcanized rubbers can be achieved by compounding polymers with silica at a temperature of 130° C. to about 200° C., in the presence of an alkyl alkoxysilane silica dispersing aid and a very small amount of a MS (i.e., a ratio of MS to alkyl alkoxysilane of a maximum of 0.14:1). Preferably the compounding temperature about 155° C. to about 200° C., more preferably about 165° C. to about 200° C., most preferably about 170° C. to about 200° C., especially about 170° C. to about 185°

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A sulfur-vulcanizable elastomeric compound, comprising:
   an elastomer optionally having an alkoxysilane terminal group;
   a reinforcing filler comprising silica or a mixture thereof with carbon black;
   an alkyl alkoxysilane present in an amount of about 0.1% to about 20% by weight based on the silica;
   a mercaptosilane silica coupling agent;
   wherein the weight ratio of the mercaptosilane to the alkyl alkoxysilane is a maximum of 0.14:1; and
   a cure agent comprising an effective amount of sulfur to achieve a satisfactory cure, wherein the elastomer, the silica, the alkyl alkoxysilane and the mercaptosilane are mixed together, in the absence of the cure agent, at a temperature of about 155° C. to about 200° C.

2. The compound of claim 1, wherein the weight ratio of the mercaptosilane to the alkyl alkoxysilane is about 0.001:1 to about 0.10:1.

3. The compound of claim 2, wherein the weight ratio of the mercaptosilane to the alkyl alkoxysilane is about 0.01:1 to about 0.10:1.

4. The compound of claim 1, wherein the mercaptosilane is present in an amount of about 0.0001% to about 3% by weight, based on the weight of the silica.

5. The compound of claim 4, wherein the mercaptosilane is present in an amount of about 0.001% to about 1.5% by weight, based on the weight of the silica.

6. The compound of claim 5, wherein the mercaptosilane is present in an amount of about 0.01% to about 1% by weight, based on the weight of the silica.

7. The compound of claim 1, wherein the alkyl alkoxysilane is present in an amount of about 0.1% to about 20% by weight, based on the silica.

8. The compound of claim 7, wherein the alkyl alkoxysilane is present in an amount of about 1% to about 15% by weight, based on the silica.

9. The compound of claim 8, wherein the alkyl alkoxysilane is present in an amount of about 1% to about 10% by weight, based on the silica.

10. The compound of claim 1, wherein the mercaptosilane has the formula wherein X is a halogen or an alkoxy; R is $C_1$ to $C_4$ alkylene; R' is independently $C_1$ to about $C_{10}$ alkyl, about $C_7$ to about $C_{30}$ alkaryl, about $C_5$ to about $C_{30}$ cycloaliphatic, or $C_6$ to about $C_{20}$ aromatic; and "n" is an integer from 1 to 3.

11. The compound of claim 1, wherein the alkyl alkoxysilane compound has the formula wherein the alkoxy groups are the same or different from each other, each $R^1$ independently comprises $C_1$ to about $C_{20}$ aliphatic, about $C_5$ to about $C_{20}$ cycloaliphatic, or about $C_6$ to about $C_{20}$ aromatic, each $R^2$ independently comprises $C_1$ to about $C_6$, and p is an integer from 1 to 3.

12. The compound of claim 11, wherein the alkyl alkoxysilane is an alkyl trialkoxysilane.

13. The compound of claim 1, wherein the elastomer is selected from the group consisting of homopolymers of conjugated diene monomers, and copolymers and terpolymers of the conjugated diene monomers with monovinyl aromatic monomers and trienes.

14. The compound of claim 1, wherein the elastomer, the silica, the alkyl alkoxysilane, and the mercaptosilane are mixed together, in the absence of the cure agent, at a temperature of about 130° C. to about 200° C.

15. The compound of claim 14, wherein the temperature is about 155° C. to about 200° C.

16. The compound of claim 15, wherein the temperature is about 170° C. to about 185° C.

17. The compound of claim 14, wherein the compound exhibits an improved physical property compared to a similar compound containing the alkyl alkoxysilane mixed at the temperature in the absence of the mercaptosilane, the property selected from the group consisting of about a 10% to about a 30% decrease in filler flocculation after compounding as measured by ΔG', about a 4% to about a 40% increase in the tensile modulus at 300% strain, reduced hysteresis as measured by about a 1% to about a 30% decrease in tangent δ at 65° C., about a 10% to about a 30% increase in the bound rubber content, and combinations thereof.

18. The compound of claim 1, further comprising an additional processing aid selected from the group consisting of a fatty acid ester of a hydrogenated or non-hydrogenated $C_5$ or $C_6$ sugar, a polyoxyethylene derivative of a hydrogenated or non-hydrogenated $C_5$ or $C_6$ sugar, an ester of a polyol, and mixtures thereof.

19. The compound of claim 18, wherein the fatty acid ester is selected from the group consisting of sorbitan monooleate, sorbitan dioleate, sorbitan trioleate, sorbitan sesquioleate, sorbitan laurate, sorbitan palmitate, sorbitan stearate, and mixtures thereof.

20. A pneumatic tire comprising a component produced from a sulfur-vulcanized elastomeric compound, the compound comprising an elastomer optionally having an alkoxysilane terminal group, a reinforcing filler comprising silica or a mixture thereof with carbon black, an alkyl alkoxysilane present in an amount of about 0.1% to about 20% by weight based on the silica, a mercaptosilane silica coupling agent, wherein the ratio of the mercaptosilane to the alkyl alkoxysilane is a maximum of 0.14:1, and a cure agent comprising an effective amount of sulfur to achieve a satisfactory cure, wherein the elastomer, the silica, the alkyl alkoxysilane and the mercaptosilane are mixed together, in the absence of the cure agent, at a temperature of about 155° C. to about 200° C.

21. A method for preparing a sulfur-vulcanized elastomeric compound, comprising the steps of:

(a) mixing together at a temperature of about 155° C. to about 200° C., in the absence of added sulfur and cure agents, an elastomer optionally having an alkoxysilane terminal group, a reinforcing filler comprising silica or a mixture thereof with carbon black, an alkyl alkoxysilane present in an amount of about 0.1% to about 20% by weight based on the silica, and a mercaptosilane, wherein the ratio of the mercaptosilane to the alkyl alkoxysilane is a maximum of 0.14:1;

(b) allowing the mixture to cool below the mixing temperature;

(c) mixing the mixture obtained in step (b), at a temperature lower than a vulcanization temperature, with a cure agent comprising an effective amount of sulfur to achieve a satisfactory cure; and (d) curing the mixture obtained in step (c).

22. The method of claim 21, wherein the mixing temperature in step (a) is about 155° C. to about 200° C.

23. The method of claim 22, wherein the mixing temperature in step (a) is about 170° C. to about 185° C.

24. The method of claim 21, wherein the weight ratio of the mercaptosilane to the alkyl alkoxysilane is about 0.001:1 to about 0.10:1.

25. The method of claim 24, wherein the weight ratio of the mercaptosilane to the alkyl alkoxysilane is about 0.01:1 to about 0.10:1.

26. The method of claim 21, wherein the mercaptosilane is present in an amount of about 0.0001% to about 3% by weight, based on the weight of the silica.

* * * * *

UNITED STATES PATENT AND TRADEMARK OFFICE
CERTIFICATE OF CORRECTION

PATENT NO. : 6,433,065 B1  
DATED : August 13, 2002  
INVENTOR(S) : Chen-Chy Lin and William L. Hergenrother

Page 1 of 1

It is certified that error appears in the above-identified patent and that said Letters Patent is hereby corrected as shown below:

Column 25,
Lines 1-2, "having an alkoxysilanc" should read -- having an alkoxysilane --.

Signed and Sealed this

Twenty-third Day of March, 2004

JON W. DUDAS
*Acting Director of the United States Patent and Trademark Office*